United States Patent Office 2,862,961
Patented Dec. 2, 1958

2,862,961
IMPROVING THE ELECTRICAL PROPERTIES OF PENTAERYTHRITOL ESTERS BY TREATMENT WITH MAGNESIUM SILICATE

Theodore N. Goreau, Hampton, S. C., assignor to Hercules Powder Company, Wilmington, Del., a corporation of Delaware No Drawing. Application October 13, 1955
Serial No. 540,323

4 Claims. (Cl. 260—488)

The present invention relates to a process for the treatment of synthetic plasticizers to improve their electrical properties. More particularly, it relates to a process for improving the electrical properties of a synthetic ester prepared by the esterification of a polyhydric alcohol and a monobasic carboxylic acid which comprises contacting said ester with an inorganic adsorbent.

Esters of polyhydric alcohols and monobasic carboxylic acids have been used for many years as plasticizers for synthetic resins, particularly for synthetic vinyl polymers such as polyvinyl chloride. While these esters have proved to be more than satisfactory plasticizers in many respects, in some applications their electrical properties are relatively poor. Thus, for example, the volume resistivities of such plasticizers are often so low that the plasticizers are not fully acceptable for use in synthetic resins that are to be fabricated for use in certain electrical applications.

In the past, attempts have been made to decolorize various organic esters by contacting them with an inorganic adsorbent such as an activated clay. For the most part, these adsorbent treatments have been applied to naturally-occurring esters such as fatty acid glycerides. In other instances, treatment has been applied to synthetic esters, e. g., esters of o-phthalic acid, but no improvement in electrical properties of these esters has been observed. As far as is known, synthetic esters of polyhydric alcohols and monobasic carboxylic acids have not been subjected to treatment of the type described herein.

It has now been found that synthetic esters of a polyhydric alcohol and a monobasic carboxylic acid, particularly esters of pentaerythritol and monobasic carboxylic acids, can be improved significantly in their electrical properties by contacting said esters with an inorganic adsorbent. In accordance with this discovery, the invention provides a process which comprises contacting an ester of a polyhydric alcohol and a monobasic carboxylic acid with an inorganic adsorbent for a time of at least about one minute.

Among the inorganic adsorbents that can be used in practicing the invention are naturally-occurring clays of the bentonite, montmorillonite and attapulgite types which have been activated by treatment with an acid or base. Synthetic inorganic adsorbents such as metallic silicates can also be used and, in fact, an outstanding adsorbent is synthetic hydrous magnesium silicate. In addition, inorganic adsorbents such as silica gel, activated alumina and silicic acid are operable. All of these are characteristically silicic, i. e., silicon-containing materials.

In order to illustrate the invention in further detail, the following examples are presented. Parts and percentages are by weight unless otherwise specified.

EXAMPLES 1 THROUGH 22

The plasticizer treated in these examples was pentaerythritol tetrahexanoate. The inorganic adsorbents which were used include "Magnesol" [a synthetic hydrous magnesium silicate $(MgO.2.5SiO_2.H_2O)$ prepared in accordance with U. S. Patent No. 2,393,625 which had a free moisture content of about 10%, contained about 2% chlorides calculated as calcium chloride and possessed a particle size of 99–100% through 325 mesh], "Super Filtrol" (an acid-activated bentonite of particle size −75+200 mesh), activated alumina (70 and 200 mesh), silica gel (200 mesh) and Florex XXX (a calcined Florida fuller's earth having a particle size of 90% through 200 mesh).

The treatment of the plasticizer was carried out by heating the plasticizer to 135° C. and then slurrying it with a predetermined precentage of adsorbent based on the weight of plasticizer for 15 minutes. At the completion of the slurrying, there was added about 2% of diatomaceous earth (an inert filter aid) and the plasticizer and adsorbent were next separated by filtration. Acid numbers, hydroxyl contents, hazen colors and volume resistivities were determined before and after the treatment. The results obtained are presented below in tabular form:

Table I

| Example No. | Adsorbent | Percent adsorbent | Time (min.) | Temp. (° C.) | Product characteristics ||||
|---|---|---|---|---|---|---|---|---|
| | | | | | Acid No. | Percent hydroxyl | Hazen color | Volume resistivity (ohm-cm. ×10¹¹) |
| 1 | "Super Filtrol" | 5 | 15 | 20 | 0.03 | 0.25 | 350 | 29.6 |
| 2 | ----do---- | 5 | 15 | 80 | 0.16 | 0.32 | 295 | 33.6 |
| 3 | ----do---- | 5 | 15 | 135 | 0.59 | 0.23 | 510 | 39.2 |
| 4 | ----do---- | 5 | 10 | 135 | | | 530 | 31.5 |
| 5 | ----do---- | 5 | 30 | 135 | | | 540 | 33.2 |
| 6 | "Magnesol" | 2 | 15 | 135 | 0.04 | 0.22 | 380 | 33.0 |
| 7 | ----do---- | 5 | 15 | 135 | 0.01 | 0.28 | 290 | 74.7 |
| 8 | ----do---- | 6 | 15 | 135 | 0.04 | 0.26 | 285 | 99.0 |
| 9 | ----do---- | 7 | 15 | 135 | 0.01 | 0.22 | 340 | 174.0 |
| 10 | ----do---- | 8 | 15 | 135 | 0.01 | 0.28 | 310 | 118.0 |
| 11 | ----do---- | 10 | 15 | 135 | 0.02 | 0.22 | 320 | 149.0 |
| 12 | ----do---- | 10 | 15 | 20 | 0.02 | 0.28 | 285 | 33.2 |
| 13 | ----do---- | 10 | 15 | 80 | 0.01 | 0.30 | 290 | 34.8 |
| 14 | ----do---- | 10 | 10 | 135 | 0.03 | 0.25 | 310 | 78.6 |
| 15 | ----do---- | 10 | 30 | 135 | 0.01 | 0.28 | 310 | 80.5 |
| 16 | Activated alumina (70 mesh) | 5 | 15 | 135 | Nil | 0.29 | 380 | 41.7 |
| 17 | Activated alumina (200 mesh) | 5 | 15 | 135 | Nil | | 440 | 36.6 |
| 18 | Silica gel | 10 | 15 | 135 | 0.06 | 0.20 | 370 | 40.6 |
| 19 | Florex XXX | 5 | 15 | 135 | 0.05 | 0.28 | 260 | 43.0 |
| 20 | Silicic acid | 5 | 15 | 135 | 0.06 | 0.31 | 490 | 24.4 |

INITIAL CHARACTERISTICS OF PLASTICIZER

Acid No. _____ 0.02
Percent hydroxyl _____ 0.025
Hazen color _____ 400
Vol. resistivity _____ ohm-cm. 7.08×10¹¹

In additional experiments, the plasticizer was treated as above with a given adsorbent, filtered, treated with a different adsorbent, and then filtered again. The results were as follows:

*Table II*

| Example No. | Adsorbent | Percent adsorbent | Time (min.) | Temp. (° C.) | Product characteristics ||||
|---|---|---|---|---|---|---|---|---|
| | | | | | Acid No. | Percent hydroxyl | Hazen color | Volume resistivity (ohm-cm. $\times 10^{11}$) |
| 21 | "Super Filtrol" / "Magnesol" | 5 / 10 | 15 / 15 | 135 / 135 | 0.10 | 0.35 | 435 | 52.2 |
| 22 | "Magnesol" / "Super Filtrol" | 10 / 5 | 15 / 15 | 135 / 135 | 0.82 | 0.35 | 520 | 47.1 |

The data tabulated above show that in every instance an improvement in volume resistivity was obtained. It is further pointed out that the improvement in volume resistivity is independent of improvement in color because in some instances deterioration of color was observed and is also independent of change in acid number because in some instances an increase in acid number was noted. It is significant also that a treatment with two different adsorbents can be used although such treatment offers no particular advantages.

Among the adsorbents, synthetic hydrous magnesium silicate ("Magnesol") is outstanding with respect to improvement in volume resistivity, and use of this adsorbent has the further advantages that color is incidentally improved and acid number is unchanged.

EXAMPLE 23

In this example the plasticizer treated was 1,1,1-trimethylolpropane trihexanoate having an initial volume resistivity of $26.6 \times 10^{11}$ ohm-cm. Treatment with 5% "Magnesol" for 15 minutes at 135° C. raised the volume resistivity $49.4 \times 10^{11}$ ohm-cm. Treatment with "Super Filtrol" for 15 minutes at 135° C. raised the volume resistivity to $43.2 \times 10^{11}$ ohm-cm.

EXAMPLE A

That the improvement in the plasticizers obtained by the process of the invention is not applicable generally to other plasticizers was demonstrated by the treatment of di(2-ethylhexyl) adipate and di(2-ethylhexyl) phthalate by the same manipulative procedures of Example 1. The following results were noted:

and monohydric alcohols, thus demonstrating the selectivity of the invention as far as the general chemical composition of the plasticizer is concerned.

The variables which to some extent may affect the degree of improvement of the plasticizers are the amount of adsorbent and the time and temperature of treatment. Of these, temperature has been found to be the most important; the higher the temperature, within reason, the greater is the improvement in volume resistivity. While any temperature below that at which the plasticizer undergoing treatment decomposes or darkens can be used, a temperature of from about 20 to 175° C. is generally used with a temperature of from about 100 to 150° C. being preferred.

The time of contact has been found to have little effect on the results obtained. A contact time of at least about 1 minute(s) is recommended to assure adequate treatment but there is no upper limit on the time of contact.

The amount of adsorbent can be varied widely, it being understood that any finite amount of adsorbent used for any finite length of time will result in some improvement. A recommended minimum amount is 0.1% of the weight of plasticizer while the maximum that can be used is solely a matter of economy and simplicity.

The contacting of the adsorbent and the plasticizer can be carried out by any of several manipulative procedures known to the art. The examples have illustrated contact by slurrying but other equivalent procedures, e. g., percolation, etc., can be used.

The process of the invention is applicable to any plasticizer that is essentially a synthetic complete ester of a polyhydric alcohol and a monobasic carboxylic acid. It is particularly effective when applied to tetraesters

*Table III*

| Plasticizer | Adsorbent | Percent adsorbent | Time (min.) | Temp. (° C.) | Product characteristics ||||
|---|---|---|---|---|---|---|---|---|
| | | | | | Acid No. | Percent hydroxyl | Hazen color | Volume resistivity (ohm-cm. $\times 10^{11}$) |
| Di(2-ethylhexyl) phthalate | "Super Filtrol" | 5 | 15 | 135 | 1.65 | 0.03 | 137 | 0.716 |
| Do | "Super Filtrol" / "Magnesol" | 5 / 5 | 15 / 15 | 135 / 135 | 3.8 | Nil | 145 | 0.20 |
| Di(2-ethylhexyl) adipate | "Super Filtrol" | 5 | 15 | 135 | 0.21 | 0.07 | 100 | 2.28 |
| Do | "Super Filtrol" / "Magnesol" | 5 / 5 | 15 / 15 | 135 / 135 | 0.13 | 0.05 | 180 | 2.87 |

INITIAL CHARACTERISTICS OF PLASTICIZERS

| | Di(2-ethylhexyl) phthalate | Di(2-ethylhexyl) adipate |
|---|---|---|
| Acid No | Nil | 0.03 |
| Percent hydroxyl | Nil | Nil |
| Hazen color | 67 | 67 |
| Vol. resistivity ohm-cm | $2.14 \times 10^{11}$ | $3.19 \times 10^{11}$ |

It is apparent from the above results that treatment with an inorganic adsorbent can actually detract from the electrical properties of esters of dicarboxylic acids of pentaerythritol and alkyl carboxylic acids, containing from about 4 to 12 carbon atoms, e. g., n-butyric, n-valeric, n-caproic, caprylic, capric, etc. acids. It is also effective, however, on corresponding esters of polyhydric alcohols, particularly those containing at least three hydroxy groups, such as 1,1,1-trimethylolethane, 1,1,1-trimethylolpropane, glycerol, dipentaerythritol, tripentaerythritol and the like.

What I claim and desire to protect by Letters Patent is:

1. The process which comprises contacting a synthetic tetraester of pentaerythritol and an alkanoic acid containing from 4 to 12 carbon atoms with synthetic hydrous magnesium silicate for at least about one minute to increase the volume resistivity of said ester.

2. The process of claim 1 in which the temperature of the ester is from about 20 to 175° C.

3. The process which comprises contacting the tetra-ester of pentaerythritol and a mixture of alkyl carboxylic acids having an average chain length of $C_6$ with a synthetic hydrous magnesium silicate at a temperature of from about 20 to 175° C. and for a time of at least about one minute, the amount of adsorbent being at least 0.1% by weight of said ester.

4. The process of claim 1 in which the amount of adsorbent is at least 0.1% by weight of said ester.

References Cited in the file of this patent

UNITED STATES PATENTS

| | | |
|---|---|---|
| 2,618,644 | Bailey | Nov. 18, 1952 |
| 2,639,289 | Vogel | May 19, 1953 |
| 2,642,389 | Cohen et al. | June 16, 1953 |
| 2,668,848 | Neuworth | Feb. 9, 1954 |
| 2,776,984 | Mention et al. | Jan. 8, 1957 |

OTHER REFERENCES

Kraus, C. A.: "The Properties of Electrically Conducting Systems," Chemical Catalog Co., N. Y. (1922), pp. 19, 88–98.

Cassidy, H. G.: "Adsorption and Chromatography," Interscience Pub. Co., N. Y. (1951), page 139.